Sept. 10, 1935. P. BAUMANN ET AL 2,013,996
PRODUCTION OF ACETYLENE
Filed Aug. 19, 1931
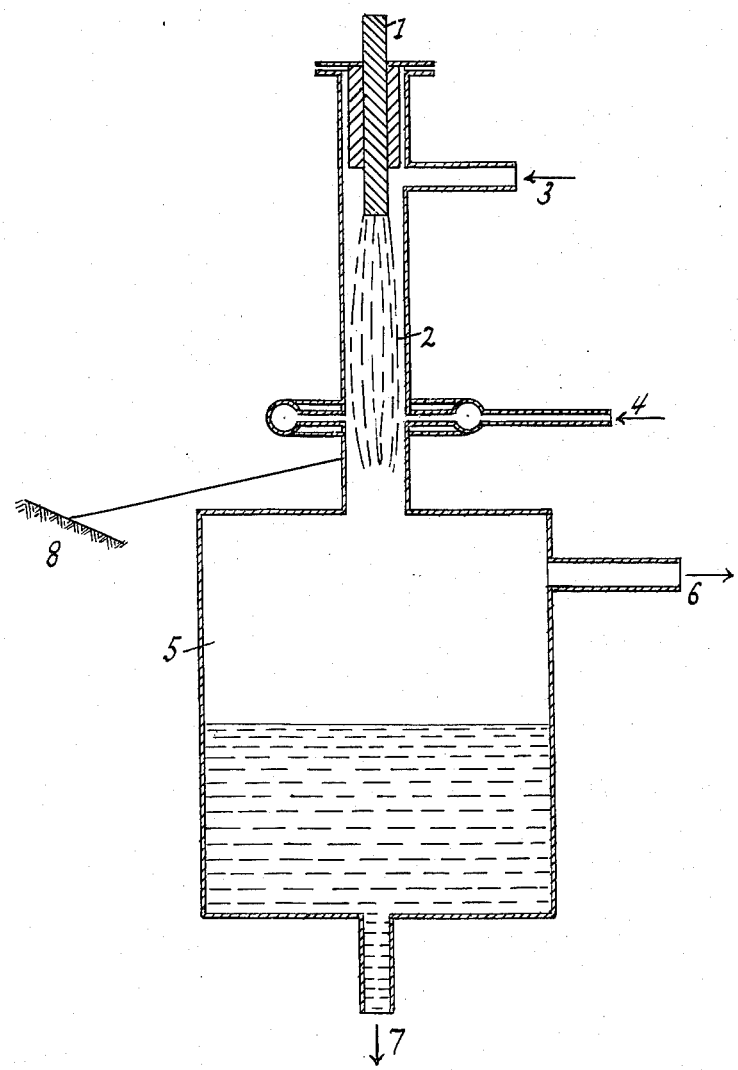
INVENTORS
Paul Baumann
Robert Stadler
BY their ATTORNEYS Patented Sept. 10, 1935

2,013,996

UNITED STATES PATENT OFFICE 2,013,996

PRODUCTION OF ACETYLENE

Paul Baumann, Ludwigshafen-on-the-Rhine, and Robert Stadler, Ziegelhausen, Germany, assignors to I. G. Farbenindustrie Aktiengesellschaft, Frankfort-on-the-Main, Germany Application August 19, 1931, Serial No. 558,174
In Germany August 27, 1930

7 Claims. (Cl. 204—31)

The present invention relates to improvements in the production of acetylene.

It has already been proposed to prepare acetylene from gaseous hydrocarbons such as methane, ethane, propane, butane, or ethylene, propylene, or butylene or gases containing the same such as natural gas or cracking gases by means of the electric arc. The acetylene however thereby formed is very liable to be decomposed into its elements at the high temperatures prevailing in the electric arc and it also easily forms various polymerization and condensation products in particular when it is brought into contact with carbon black.

The deposition of carbon in the arc furnace may lead to serious troubles and the formation of the other products often renders difficult the further working up of the acetylene formed. In order to overcome the said objections it has already been proposed to cool the gases issuing from the electric arc and which have a temperature of about 1600° C., by indirect cold-transfer to such a temperature at which the velocity of decomposition and conversion of the acetylene formed in the electric arc is only very small, for example to temperatures below about 250° to 300° C. In most cases this is effected by providing behind the electric arc water-cooled metal surfaces to which the gases leaving the arc may impart their sensible heat. The carbon black resulting from the decomposition of the hydrocarbons in the electric arc, however, deposits on the cooled surfaces, even if it is formed in very small amounts, thereby impairing the transference of cold and, on account of the increase in temperature of the gases, rendering possible the said injurious conversions of the acetylene. Consequently though the formation of larger amounts of carbon black is prevented, it is necessary to interrupt from time to time the working of the arc and to clean the cooled surfaces.

The present invention has for its object to overcome these objections and to ensure in a continuous process the preparation of acetylene from gaseous hydrocarbons by means of the electric arc without the formation of carbon black and polymerization or condensation products.

We have found that the preparation of acetylene is effected in an advantageous and successful manner by chilling the gases treated in the electric arc by the injection of liquids. The liquids are preferably injected immediately behind the electric arc. For example by injecting comparatively small amounts of water the treated gases may be cooled down in a very short time to temperatures far below 100° C. The requisite of the liquids to be injected depends on the temperature of the gas issuing from the electric arc, on the temperature which it is desired to attain, and on the specific heat of the liquid employed. Taking into account that the specific heat of the gases issuing from the electric arc usually ranges between 0.3 and 0.4 kilocalories per cubic meter, and that the specific heat of the said liquids is known the particular amount of liquid required may be easily calculated in each case. Contrary to expectation the water injected into the gases does not cause any appreciable formation of carbon monoxide or carbon dioxide nor does it decrease the yield of acetylene, and the content of olefines and of conversion products of acetylene in the gases leaving the electric arc is, in any case, smaller when cooling by the injection of liquids than when cooling by means of cooled surfaces.

The greater part of the injected liquid is collected in a receiver and, if desired after a previous purification, again returned to the process. The recovery of the reaction products absorbed by the injected liquid, in particular by the water may be effected in any manner used in the recovery of gases from liquids, for example by warming or evacuation.

By the injection of the liquid the efficiency of the electric arc is increased. If the liquid is injected in the same direction as the stream of the gas or so that its movement has a component lying in the direction of the stream of this gas the arc is elongated whereby the working tension of the arc may be increased up to about 30 per cent.

The beforementioned objections occurring when employing cooled surfaces are overcome according to the present invention even if the gases withdrawn are allowed to remain at a temperature higher than 100° C. for example at temperatures up to about 500° C., but preferably only up to about 250° or 300° C. In addition to these advantages it is possible by the process according to the present invention to obtain the steam necessary for any desired further working up of the acetylene for example, for the catalytic conversion of acetylene with steam to form acetaldehyde, acetone or acetic acid by adjusting the amount of the injected water so that a temperature is obtained at which a mixture of gas and steam is formed which may be directly employed for the further working of acetylene. The yield of the hot mixture of gas and steam may also be rendered useful for other purposes.

The process according to the present invention may be carried out with particular advantage when employing liquids having a high boiling point and which may be heated to high temperatures without decomposition, as for example mercury. The heat contained in these liquids collected behind the electric arc may be used with advantage for any technical purposes for example for the production of steam. In this manner the greatest part of the heat contained in the treated gases may be regenerated.

As cooling liquids are also employed with advantage those which are capable of absorbing, either by entering into reaction with or by dissolving, the impurities such as carbon dioxide, hydrogen sulphide or cyanogen compounds as for example hydrocyanic acid or dicyanogen, usually contained in the gases obtained by treating industrial hydrocarbon gases, such as natural gas or cracking gases or illuminating gas or waste gases from the destructive hydrogenation in the electric arcs. In this manner the cooling of the electric arc gases is simply combined with the removal of the impurities necessary before further working up these gases. As liquids chemically reacting with the said impurities may be mentioned all kinds of liquids, such as solutions having an alkaline reaction, such as caustic soda solution, caustic potash solution, milk of lime, aqueous ammonia, sodium bicarbonate, potassium bicarbonate and the like. As solvents, high boiling hydrocarbon oils and tetrachlorethane are suitable.

The accompanying drawing illustrates diagrammatically a vertical section of an apparatus suitable for the process according to the present invention. In this drawing 1 is an electrode which is charged with a high tension of about 1000 volts. 2 denotes the electric arc, 3 the place at which the initial gases are introduced, 4 an annular device by which liquid may be injected at the end of the electric arc. 5 represents a vessel for collecting the liquid, 6 the place at which the gases leave the vessel 5 and 7 the place at which the liquid is withdrawn. The furnace is connected with the earth at 8.

The following examples will further illustrate the nature of this invention, but the invention is not restricted to these examples.

*Example 1*

100 cubic meters of a mixture of methane and hydrogen containing 50 per cent of methane are passed per hour through an electric arc furnace in which the gases leaving the arc are chilled by walls cooled with water. The final gas contains 8.5 per cent of unsaturated hydrocarbons of which 7 per cent are acetylene. The power of the furnace is 120 kilowatts per hour. At the beginning the temperature of the chilled gas amounts to from 80° to 90° C., after a certain duration of working it rises to 300° C. the content in acetylene of the final gas being reduced to 6.5 per cent. At the same time the cooled surfaces are covered with a layer of carbon black and conversion products of acetylene, and it is necessary to stop the process in order to clean the cooled surfaces.

If, however, in the same furnace the cooled surfaces are replaced by devices allowing of injecting liquids as illustrated in the accompanying drawing and if the gases treated in this furnace are cooled by injecting from 300 to 500 liters of water per hour the temperature of the final gas is continuously maintained at a temperature of from 50° to 60° C. The power of the arc amounts to 140 kilowatts per hour in this case, the content of the final gas in unsaturated compounds is 9.2 per cent, the content in acetylene is 8.3 per cent.

The water collected in the receiver contains a gas which in turn contains larger amounts of cyanic acid and which may be separated from the liquid by warming or by evacuation. The inner surfaces of the arc furnace are entirely clean even after working for 500 hours.

If under otherwise similar conditions 80 liters of water are injected per hour a mixture of gas and steam is obtained which has a temperature of about 300° C. and which may be directly employed for the catalytic conversion of the acetylene into acetaldehyde.

*Example 2*

100 cubic meters of a mixture of methane and hydrogen containing 50 per cent of methane, 43 per cent of hydrogen, 4 per cent of nitrogen and 3 per cent of carbon dioxide, are led per hour through an electric arc furnace. By spraying in about 500 liters of water per hour, the waste gases contain (in addition to 8.5 per cent of unsaturated hydrocarbons of which 7 per cent is acetylene) 2 per cent of carbon dioxide and 1.5 grams of hydrocyanic acid per cubic meter of waste gases as impurities. If, on the contrary, 500 liters of 7 per cent caustic soda solution be employed instead of water, the gas thus treated contains less than 0.2 per cent of carbon dioxide and hydrocyanic acid can only be detected in very slight traces. It is preferable to cause the gas and the sprayed-in liquid to remain in contact as long as possible and as intimately as possible.

What we claim is:

1. In the production of acetylene by treatment in the electric arc of a gas comprising a gaseous hydrocarbon the step which comprises chilling the gas issuing from said arc to a temperature below 300° C. by injecting thereinto at the point of its issuance from the arc a sufficient amount of a liquid selected from the class consisting of water and alkaline solutions.

2. In the production of acetylene by treatment in the electric arc of a gas comprising methane the step which comprises chilling the gas issuing from said arc to a temperature below 300° C. by injecting thereinto at the point of its issuance from the arc a sufficient amount of water.

3. In the production of acetylene by treatment in the electric arc of a gas comprising a gaseous hydrocarbon the step which comprises chilling the gas issuing from said arc to a temperature below 100° C. by injecting thereinto at the point of its issuance from the arc a sufficient amount of water.

4. In the production of acetylene by treatment in the electric arc of a gas comprising a gaseous hydrocarbon the step which comprises chilling the gas issuing from said arc to a temperature between 100° and 300° C. by injecting thereinto at the point of its issuance from the arc water in an amount to obtain the said temperature.

5. In the production of acetylene by treatment in the electric arc of an industrial gas containing hydrocarbons the step which comprises chilling the gas issuing from said arc to a temperature below 300° C. by injecting thereinto at the point of its issuance from the arc a sufficient amount of a liquid selected from the class consisting of water and alkaline solutions, which liquid is capable of absorbing the impurities, such as carbon dioxide, hydrogen sulphide and cyanogen compounds, contained in the said gas issuing from the arc.

6. In the production of acetylene by treatment in the electric arc of a gas comprising a gaseous hydrocarbon the step which comprises chilling the gas issuing from said arc to a temperature below 300° C. by injecting thereinto at the point of its issuance from the arc a sufficient amount of a liquid having an alkaline reaction.

7. In the production of acetylene by treatment in the electric arc of a gas comprising a gaseous hydrocarbon the step which comprises chilling the gas issuing from said arc to a temperature below 300° C. by injecting thereinto at the point of its issuance from the arc a sufficient amount of an aqueous caustic soda solution.

PAUL BAUMANN.
ROBERT STADLER.